United States Patent [19]
Alten

[11] Patent Number: 5,167,101
[45] Date of Patent: Dec. 1, 1992

[54] DEFORMABLE SEALING DEVICE FOR A GAP BETWEEN A WALL OPENING OF A BUILDING WALL AND A BACK WALL OF A VEHICLE

[76] Inventor: Kurt Alten, Ringstr. 14, D-3015 Wennigsen, Fed. Rep. of Germany

[21] Appl. No.: 766,554

[22] Filed: Sep. 25, 1991

[30] Foreign Application Priority Data

Sep. 25, 1990 [DE] Fed. Rep. of Germany ....... 4030267

[51] Int. Cl.⁵ ........................................... E04H 14/00
[52] U.S. Cl. ............................................... 52/173 DS
[58] Field of Search ..................... 52/2.12, 173 DS; 49/123, 303, 316, 477, 483; 14/71.5

[56] References Cited

U.S. PATENT DOCUMENTS

| | | |
|---|---|---|
| 3,352,314 | 11/1967 | Frommelt et al. . |
| 3,683,572 | 8/1972 | Alten ............................... 52/173 R |
| 4,349,992 | 9/1982 | Layne ............................. 52/173 DS |
| 4,636,423 | 1/1987 | Reid ............................... 52/173 DS |

FOREIGN PATENT DOCUMENTS

| | | |
|---|---|---|
| 2018988 | 4/1970 | Fed. Rep. of Germany . |
| 7905254 | 2/1979 | Fed. Rep. of Germany . |
| 8300412 | 1/1983 | Fed. Rep. of Germany . |
| 3631591 | 9/1986 | Fed. Rep. of Germany . |

*Primary Examiner*—David A. Scherbel
*Assistant Examiner*—Beth A. Aubrey
*Attorney, Agent, or Firm*—Robert W. Becker & Associates

[57] ABSTRACT

A deformable sealing device for a gap between a wall opening of a building wall and a back wall of a vehicle docking at the wall opening is provided. The sealing device comprises a skirt supported at respective support bodies. The support bodies are elastically deformable in a direction toward the building wall. The skirt comprises an upper transverse portion and two vertical strips that are arranged parallel to vertical sides of the wall opening. A lower transverse portion is also part of the skirt and extends between respective bottom sections of the vertical strips and is supported at a lower edge thereof at a further support body that is elastically deformable in the direction toward the building wall.

25 Claims, 2 Drawing Sheets

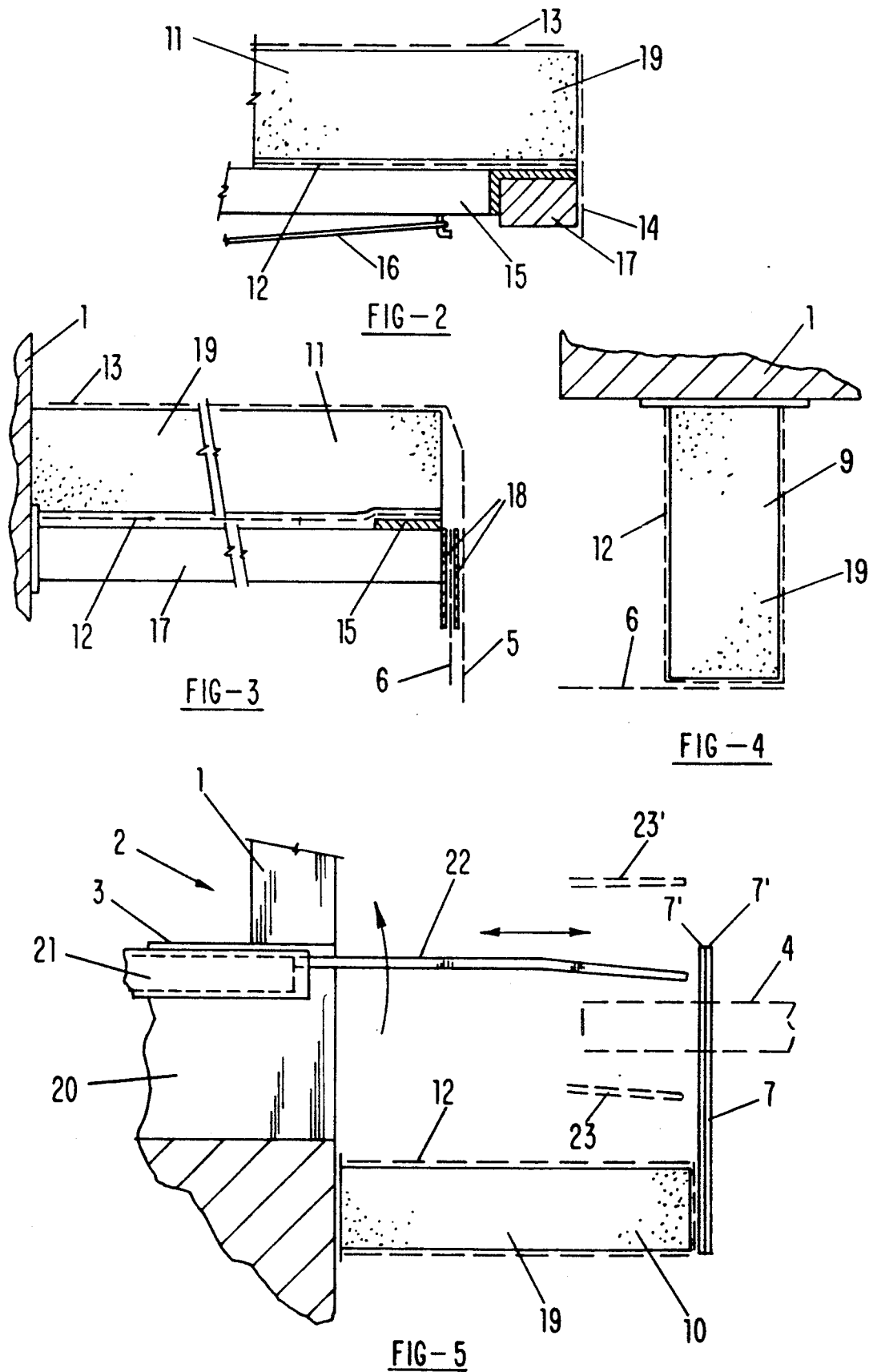

DEFORMABLE SEALING DEVICE FOR A GAP BETWEEN A WALL OPENING OF A BUILDING WALL AND A BACK WALL OF A VEHICLE

BACKGROUND OF THE INVENTION

The present invention relates to a deformable sealing device for a gap between a wall opening of a building wall and a back wall of a vehicle docking at the wall opening, whereby the sealing device comprises a skirt supported at respective support bodies. The support bodies are elastically deformable in a direction towards the building wall. The skirt comprises an upper transverse portion and two vertical strips that are arranged parallel to vertical sides of the wall opening.

Sealing devices of the aforementioned kind have been employed successfully, however, energy losses in a downward direction in the area between the vertical strips of the skirt in the vicinity of the building floor, for example, at refrigerated buildings (due to the introduction of warm air) or warehouses that are operated at room temperature (due to the introduction of cold air), may not be avoided, not even when the platform of the vehicle to be loaded or unloaded provides a closing in the downward direction to a certain extent.

It is therefore an object of the present invention to improve the aforementioned sealing devices such that a substantially improved sealing action with respect to energy savings is achieved.

BRIEF DESCRIPTION OF THE DRAWINGS

This object, and other objects and advantages of the present invention, will appear more clearly from the following specification in conjunction with the accompanying drawings, in which:

FIG. 2 shows a cross-sectional view along the line II—II of FIG. 1;

FIG. 3 shows a cross-sectional view along the line III—III of FIG. 1;

FIG. 4 shows a cross-sectional view along the line IV—IV of FIG. 1; and

FIG. 5 shows a cross-sectional view along the line V—V of FIG. 1.

SUMMARY OF THE INVENTION

Figure 1:
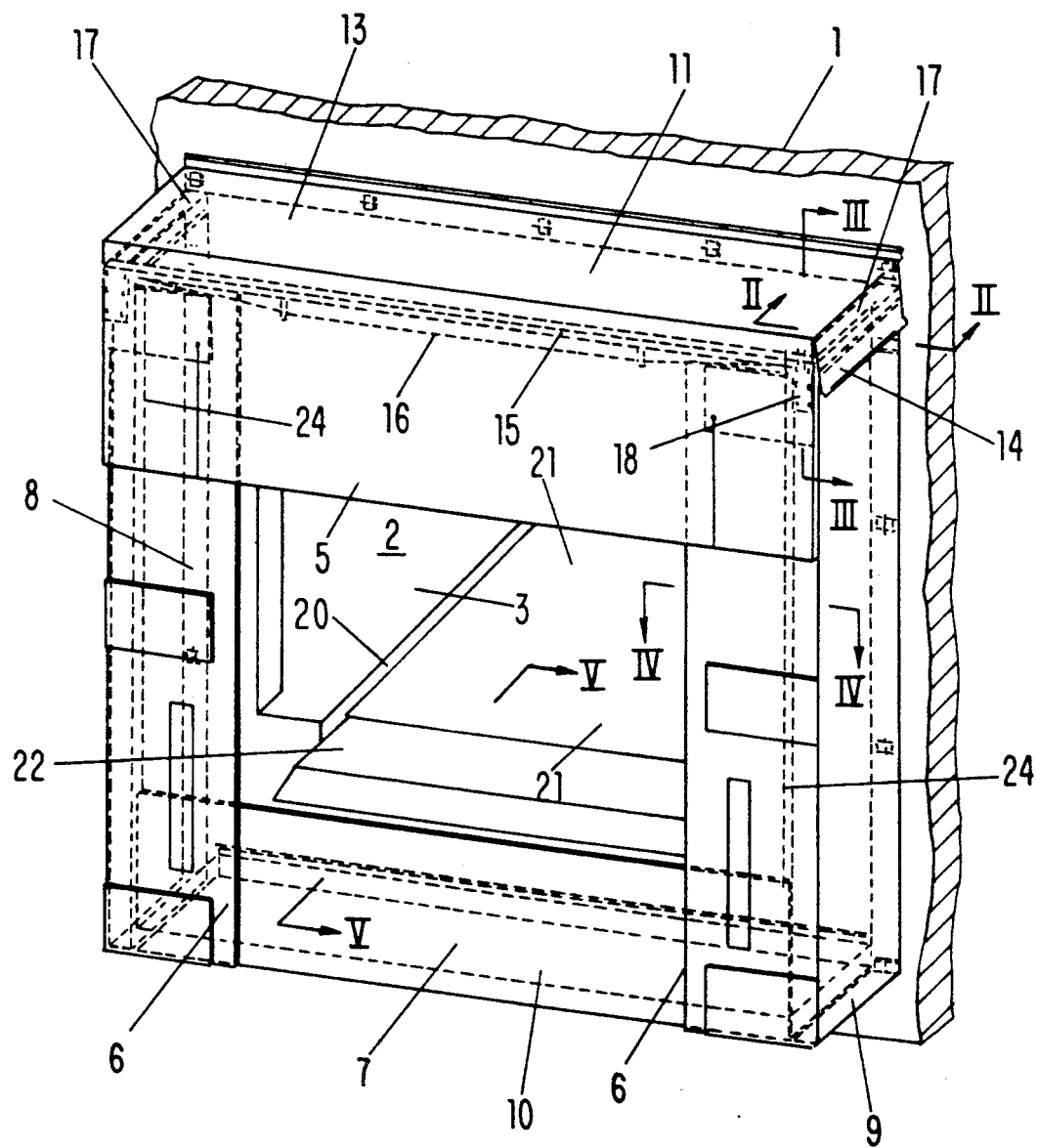
FIG. 1 shows in a perspective view a sealing device for a gap between a wall opening and a back wall of a vehicle docking at the wall opening.

The deformable sealing device of the present invention is primarily characterized by a lower transverse portion as a part of the skirt, that extends between the respective bottom sections of the vertical strips and is supported at a lower edge thereof at a further support body that is elastically deformable in the direction toward the building wall. Such an additional lower transverse portion in connection with an equally deformable support body which is comprised essentially of a soft block of foamed material, has the advantage that this additional lower transverse portion of the sealing device below the loading platform of the vehicle may adapt sufficiently to the contours of the vehicle in order to prevent the loss of heated or cooled air.

It is preferable that the lower transverse portion is arranged behind the vertical strips when viewed in the direction toward the building wall, and that the upper transverse portion is positioned before the vertical strips, viewed in the same direction. The lower transverse portion is preferably comprised of a plurality of adjacent layers that are made of fabric which is coated with a plastic or rubber coating. Preferably, two such layers of fabric are provided for the lower transverse portion.

In a further embodiment of the present invention the further support body is comprised of a block of soft, elastically deformable foam and is attached with one face thereof to the building wall. This block is tightly enclosed by a pull-resistant outer cover to which the lower transverse portion is fastened. The lower transverse portion, at an upper edge thereof at outwardly oriented positions, may be provided with a pull cord which is preferably made of an elastic material. The pull cord, with a free end thereof, may be connected to a wall fixture.

It is preferred that the lower transverse portion together with the further support body are deformable independently of the vertical strips and their respective corresponding support bodies. It is expedient that a respective one of the support bodies supporting the upper transverse portion is made of a block of a soft, elastically deformable foam and the upper transverse portion is fastened to a free front face of the block. This block supporting the upper transverse portion is expediently further supported by a solid support, whereby free ends thereof are resting on at least one wall fixture such that movements of the solid support relative to the wall fixture are possible. It is preferable that the block together with the upper transverse portion is liftable at respective front faces thereof, whereby the wall fixtures are arranged at end sections of the upper transverse portion. Preferably, the wall fixtures are arranged at upper corner sections of the upper transverse portion. Furthermore, the wall fixtures serve to support upper edges of the vertical strips. Preferably, the wall fixture supports laterally outwardly oriented sections of the upper edges of the vertical strips.

In a further embodiment the sealing device comprises a pivotable bridging platform and a reciprocating extension at a free end of the bridging platform. The upper edge of the lower transverse portion is essentially positioned at a same height as the surface of the bridging platform in its initial position which corresponds to the level of the floor portion of the building. In an extended and lowered end position of the bridging platform, the leading edge of the extension is positioned above and adjacent to the further support body, when viewed in the direction towards the building wall. In this position, the leading edge of the extension is positioned closely behind the lower transverse portion.

Preferably, respective ones of the support bodies supporting the vertical strips are also made of a block of a soft, elastically deformable foam and the vertical strips are fastened to a free front face of the blocks.

The lower transverse portion is thus preferably embodied such that an upper free edge thereof is essentially flush with the level of the floor portion of the building while the respective corresponding horizontal support body is arranged at a location below the wall opening such that it is not undesireably deformed when the leading edge of the usually employed bridging platform reaches its lower end position. Due to this arrangement a sufficient deformation of the lower transverse portion by bending in an inward direction may occur while at the same time the elastically deformable support body is not influenced or even damaged by the leading edge of the bridging platform.

It is furthermore important that the outwardly oriented lower transverse portion is sufficiently deformable in the direction towards the building wall but, at the same time, is stiff enough to form a stable upwardly extending portion of the skirt which, in the space between the two vertical strips, remains in its position without external supports. For this purpose, the lower transverse portion is expediently formed of two adjacent layers of skirt fabric which is, for example, coated with plastic or rubber, and furthermore a cord for suspending the lower transverse portion may be provided which is preferably arranged behind the vertical strips at the upper edge of the lower transverse portion. The free ends of the cord may be fastened in the vicinity of the upper transverse portion, preferably at the aforementioned wall fixtures.

DESCRIPTION OF PREFERRED EMBODIMENTS

The present invention will now be described in detail with the aid of several specific embodiments utilizing FIGS. 1 through 5.

The building wall 1 of a warehouse is provided with a wall opening 2 that may be closed off by a sectional gate or similar arrangements. On the floor portion 3 of the building ground transportation devices are operating with which the loading and unloading of the vehicles that are docked in front of the wall openings 2 is achieved. The vehicles that are docked at the wall opening 2 are usually provided with a loading platform 4.

In order to prevent energy losses and weather influences the inventive sealing device is suggested.

Spaced at a distance from the building wall 1 a deformable skirt is provided. The skirt is comprised of an upper transverse portion 5 and two vertical strips 6 that are arranged parallel to the vertical sides of the wall opening 2. The skirt further comprises a lower transverse portion 7 which is provided between the bottom sections of the vertical strips 6. While the upper transverse portion 5 is positioned before the vertical strips 6, the lower transverse portion 7 is positioned behind the vertical strips 6 in a tightly contacting manner. The skirt elements 5, 6 and 7 are comprised of a pull-resistant, flappy, foil-like material, for example, a fabric that is treated or coated with rubber or plastic. In order to hold and support the skirt elements 5, 6, 7 in a manner in which they are elastically deformable in the direction toward the building wall 2, the skirt elements 5, 6, 7 are connected to the front faces of support bodies 8, 9, 10 and 11 which are comprised of a supporting core 19 made of a soft plastic foam and a pull-resistant flexible cover 12 which tightly encloses the core 19. The outer cover 12 is comprised of a fabric or a similar material. The fastening of these support bodies 8–11 to the building wall 1 may be achieved in any known means. The support bodies 8–11 provide a frame which encloses the wall opening 2. The frame, however, is not continuous. The individual support bodies together with the respective skirt elements 5–7 may be independently deformed when a load or deformation in the direction towards the building wall occurs. The four support bodies 8–11 together with their outer cover 12 close or scale the sealing device in an outward direction, i.e. to the sides, in an upward and downward direction. However, this does not preclude the arrangement of an additional top cover 13 which is connected in water tight manner to the building wall. Both ends of the top cover 13 are further provided with overhangs 14 at both sides of the sealing device which cover the gap between the support bodies 8 respectively 9 on the one hand and the support body 11 on the other hand.

As an additional support for the upper transverse portion 5 together with its support body 11 the support body 11 is supported by a solid steel support 15 which is bending resistant due to a wire bracing 16. The ends of the support body 11 are resting loosely on wall fixtures 17. Due to this arrangement, the support body 11 may optionally give in an upward direction, respectively, it may be lifted. Optionally, the construction of the wall fixtures 17 may be such that they are provided in a telescopic arrangement so that their length may be adjustable when a docking vehicle exerts a great pressure onto the wall fixtures 17. Furthermore, the end faces of the wall fixtures 17 support the upper ends of the vertical strips 6 whereby the ends are clamped between plates 18.

In order to facilitate the access of the vehicle from the warehouse a rectangular recess 20 is provided behind, respectively, within the wall opening 2 at the floor portion 3 of the building which serves to receive a bridging platform 21. This bridging platform is pivotable about a rear transverse axis which is essentially horizontally arranged. The front end of the bridging plate 21 is provided with an extension 22 which serves to support the bridging platform 21 at the loading platform 4 of the vehicle. In its extended position, the extension 22 has an lower end position indicated by reference numeral 23 in FIG. 5 and an upper end position indicated by 23' in FIG. 5. In the lower end position 23 the leading edge of the extension 22 is arranged above and adjacent to the support body 10. In the upper end position 23' which is adjustable depending on the height of the loading platform 4 of the vehicle to be serviced the leading edge of the extension 22 is positioned closely behind the lower transverse portion 7.

In order to provide further support for the lower transverse portion 7 and the corresponding support body 10, the lower transverse portion 7 is comprised of two adjacent, respectively, contacting layers 7' which are made of a fabric that is treated or coated with rubber or a similar material. Thus, the supporting effect is extended over the entire length of the support body 10. Furthermore, at the upper edge within the end sections of the lower transverse portion 7 elastic cords 24 are provided which are connected with their free ends to the wall fixtures 17. With the inventive design, the transverse portion 7 as well as the corresponding support body 10 may adapt to the contours of the back wall of a vehicle. Thus, a good heat insulation at the lower portion of the sealing device is provided.

It is understood that the skirt elements 5–7 are fixedly connected to the respective support bodies 8–11, for example, by gluing, so that a deformation of these elements will not result in a separation of the support bodies 8–11 and the respective skirt elements 5–7. Furthermore, since the support bodies 8–10 inherently provide insulation due to their foamed structure and since they enclose the opening 2 essentially completely, the energy losses are reduced to a minimum. The skirt, due to its deformability in the direction towards the building wall 1, rests tightly at the vehicle back wall. This is especially true for the lower transverse portion 7 when it is engaged during docking by the vehicle loading platform 4.

The present invention is, of course, in no way restricted to the specific disclosure of the specification and drawings, but also encompasses any modifications within the scope of the appended claims.

What I claim is:

1. A deformable sealing device for a gap between a wall opening with vertical sides of a building wall and a back wall of a vehicle docking at the wall opening, said sealing device comprising respective support bodies, that are elastically deformable in a direction towards the building wall, and a skirt supported at said support bodies, said skirt comprising an upper transverse portion and two vertical strips that are arranged parallel to said vertical sides of the wall opening, said deformable sealing device further comprising:

a further support body and a lower transverse portion, said lower transverse portion comprising an upper and a lower edge, as a part of said skirt, wherein said vertical strips have respective bottom sections and wherein said lower transverse portion extends between said respective bottom sections of said vertical strips and is supported with said lower edge at said further support body that is elastically deformable in the direction toward the building wall.

2. A deformable sealing device according to claim 1, wherein said lower transverse portion is arranged behind said vertical strips, viewed in the direction toward the building wall.

3. A deformable sealing device according to claim 2, wherein said upper transverse portion is positioned in front of said vertical strips, viewed in the direction of the building wall.

4. A deformable sealing device according to claim 1, wherein said lower transverse portion comprises a plurality of adjacent layers.

5. A deformable sealing device according to claim 4, wherein said lower transverse portion comprises two of said adjacent layers.

6. A deformable sealing device according to claim 4, wherein said adjacent layers are made of fabric.

7. A deformable sealing device according to claim 6, wherein said fabric is provided with a coating.

8. A deformable sealing device according to claim 7, wherein said coating is made of plastic.

9. A deformable sealing device according to claim 7, wherein said coating is made of rubber.

10. A deformable sealing device according to claim 1, wherein said further support body is comprised of a block of soft, elastically deformable foam and is attached with one face thereof to the building wall.

11. A deformable sealing device according to claim 10, further comprising a pull-resistant outer cover with which said block is tightly enclosed and to which said lower transverse portion is fastened.

12. A deformable sealing device according to claim 11, wherein said lower transverse portion has an upper edge, and further comprising a pull cord connected to said upper edge at outwardly oriented positions.

13. A deformable sealing device according to claim 12, wherein said pull cord is elastic.

14. A deformable sealing device according to claim 12, further comprising a wall fixture to which said pull cord is connected with a free end thereof.

15. A deformable sealing device according to claim 1, wherein said lower transverse portion together with said further support body are deformable independently of said vertical strips and respective corresponding ones of said support bodies.

16. A deformable sealing device according to claim 1, wherein a respective one of said support bodies supporting said upper transverse portion is made of a block of a soft, elastically deformable foam and said upper transverse portion is fastened to a free front face of said block.

17. A deformable sealing device according to claim 16, further comprising a solid support for supporting said block supporting said upper transverse portion, and at least one wall fixture, with free ends of said solid support resting on said at least one wall fixture such that movements of said solid support relative to said wall fixtures are possible.

18. A deformable sealing device according to claim 17, wherein said block together with said upper transverse portion is liftable at respective front faces thereof, with said wall fixtures being arranged at end sections of said upper transverse portion.

19. A deformable sealing device according to claim 18, wherein said wall fixtures are arranged at upper corner sections of said upper transverse portion.

20. A deformable sealing device according to claim 17, wherein said wall fixture serves to support upper edges of said vertical strips.

21. A deformable sealing device according to claim 20, wherein said wall fixture supports laterally outwardly oriented sections of said upper edges of said vertical strips.

22. A deformable sealing device according to claim 1, further comprising a pivotable bridging platform and a reciprocating extension at a free end of said bridging platform, with said lower transverse portion having an upper edge essentially positioned at a same height as a surface of said bridging platform in an initial position thereof which corresponds to the floor level of the building.

23. A deformable sealing device according to claim 22, wherein, in an extended and lowered end position of said bridging platform, a leading edge of said extension is positioned above and adjacent to said further support body, viewed in the direction toward the building wall.

24. A deformable sealing device according to claim 22, wherein, in an extended end position of said bridging platform, a leading edge of said extension is positioned closely behind said lower transverse portion.

25. A deformable sealing device according to claim 1, wherein respective ones of said support bodies supporting said vertical strips are made of a block of a soft, elastically deformable foam and said vertical strips are fastened to a free front face of said blocks.

* * * * *